United States Patent
Ma (10) Patent No.: US 7,260,780 B2
(45) Date of Patent: Aug. 21, 2007

(54) METHOD AND APPARATUS FOR PROVIDING FOREIGN LANGUAGE TEXT DISPLAY WHEN ENCODING IS NOT AVAILABLE

(75) Inventor: Ji Ma, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/029,209

(22) Filed: Jan. 3, 2005

(65) Prior Publication Data

US 2006/0150098 A1    Jul. 6, 2006

(51) Int. Cl.
G06F 15/00 (2006.01)
G06F 17/28 (2006.01)
G06K 9/18 (2006.01)

(52) U.S. Cl. .......................... 715/542; 715/540; 704/2; 382/185

(58) Field of Classification Search ................ 704/2; 715/540; 382/185
See application file for complete search history.

(56) References Cited

U.S. PATENT DOCUMENTS

| | | | | | |
|---|---|---|---|---|---|
| 5,175,803 | A | * | 12/1992 | Yeh | 715/535 |
| 5,319,552 | A | * | 6/1994 | Zhong | 715/535 |
| 5,337,233 | A | * | 8/1994 | Hofert et al. | 715/540 |
| 5,918,206 | A | * | 6/1999 | Wong et al. | 704/271 |
| 5,999,706 | A | * | 12/1999 | Chrosny | 358/1.11 |
| 6,292,768 | B1 | * | 9/2001 | Chan | 704/1 |
| 6,879,951 | B1 | * | 4/2005 | Kuo | 704/10 |
| 2003/0144830 | A1 | * | 7/2003 | Williams | 704/1 |
| 2004/0172601 | A1 | * | 9/2004 | Rettig et al. | 715/523 |
| 2005/0010391 | A1 | | 1/2005 | Chen et al. | |
| 2005/0097460 | A1 | * | 5/2005 | Oh | 715/517 |
| 2005/0102132 | A1 | * | 5/2005 | Su | 704/5 |
| 2005/0222838 | A1 | * | 10/2005 | Gong | 704/5 |
| 2005/0289463 | A1 | * | 12/2005 | Wu et al. | 715/533 |

FOREIGN PATENT DOCUMENTS

| | | | |
|---|---|---|---|
| CN | 1558341 A | | 12/2004 |
| JP | 08292941 A | * | 11/1996 |
| JP | 2005250525 A | * | 9/2005 |

OTHER PUBLICATIONS

Matt Neuburg, Two Bytes of the Cherry: Unicode and Mac OS X Part 1, Apr. 1, 2002, TidBits.*

* cited by examiner

*Primary Examiner*—Tadesse Hailu
*Assistant Examiner*—Nicholas S Ulrich
(74) *Attorney, Agent, or Firm*—Christensen O'Connor Johnson Kindness PLLC (57) ABSTRACT

A method and apparatus include referencing a phonetic language database that includes double-byte font entries and associated phonetic representations of the double-byte font entries. At least one of the double-byte font entries is used to obtain a phonetic representation of the used at least one double-byte font. The phonetic representation is displayed on a display device.

16 Claims, 6 Drawing Sheets

METHOD AND APPARATUS FOR PROVIDING FOREIGN LANGUAGE TEXT DISPLAY WHEN ENCODING IS NOT AVAILABLE

FIELD OF THE INVENTION

The present invention generally relates to the handling of language characters that are not based on the Roman alphabet. In particular, the present invention relates to the handling of Chinese script characters intended for display on a computer-related system.

BACKGROUND OF THE INVENTION

Efficient implementation of user interfaces is an important consideration for designers, manufacturers, and users of electronic devices and systems. To achieve maximum effectiveness, a user interface may advantageously display information to a system user in the user's primary language.

The English language is generally written using an alphabet of twenty-six letters derived from the Romans. Other written languages, however, may employ significantly greater numbers of written characters. An example of a written language that requires a relatively large number of written characters is the Chinese language.

As background information, it is useful to have a broad understanding of languages that are not based on the Roman alphabet. Chinese, for example, has a constrained phonetic structure. In spoken Chinese, there are only 412 basic phonetic units, each unit having a mono-syllabic sound. Four sound patterns can potentially be applied to each phonetic unit, resulting in slightly more than 1,000 distinct sounds. Other languages not based on the Roman alphabet also include a vast number of characters, and may also employ the use of mono-syllabic sounds.

Conventional computer systems and operating systems generally include the use of a two byte digital encoding method to accommodate the large number of characters normally represented in languages that do not use the Roman alphabet. This is in contrast to the languages that use Roman characters, as computer displayable fonts that are associated with these languages may be encoded using only one byte of digital information. The two byte digital encoding method, also known as double-byte encoding, requires substantially greater system memory than the one byte digital encoding method.

The increased memory requirements that double-byte encoding necessitates makes the installation of software supporting these double-byte characters optional. For example, many operating systems make the installation of double-byte encoding/decoding support optional. Therefore, many computer systems today simply do not provide support for displaying documents that include double-byte encoded fonts.

The additional system memory required by double-byte encoding/decoding also places significant burdens on small-sized or portable electronic devices. These small-sized electronic devices typically have very limited system memory. Furthermore, these small-sized or portable electronic devices lack the availability to significantly expand the system memory. Accordingly, a large number of these small-sized or portable electronic devices do not include built in double-byte encoding/decoding software, and many simply cannot handle the increased memory capacity required to handle the double-byte encoding/decoding techniques.

Because many computer systems, including both larger personal computer devices and small-sized electronic devices, do not include software that is capable of handling documents that include double-byte encoded text, users will invariably receive documents with this type of encoding/decoding and will be unable to discern the contents thereof. Therefore, there remains the need to provide a method and apparatus capable of handling media that includes double-byte encoded text even if the required software to actually display the double-byte encoded text is not installed on the displaying computer device.

SUMMARY OF THE INVENTION

An exemplary embodiment of the present invention provides a method and apparatus for displaying a phonetic representation of a double-byte font used in conjunction with a communication intended to convey information. An exemplary embodiment of the present invention displays a phonetic representation of a double-byte font when an application for displaying a bitmap character image associated with the double-byte font is unavailable or the application does not otherwise support the use of bitmap character images that are representative of double-byte fonts.

According to an exemplary method of the present invention, a phonetic database is provided that associates phonetic representations with the American Standard Code for Information Interchange (ASCII) numbers that make up the various double-byte fonts that are representative of bitmap character images. Therefore, if an application does not support the use of language libraries that provide bitmap character images related to double-byte fonts, the application may reference the phonetic lookup database in accordance with an exemplary embodiment of the present invention in order to properly convey information contained in a communication that employs the use of double-byte fonts.

An exemplary embodiment of the present invention includes a method that references a table that includes double-byte font entries and associated phonetic representations of the double-byte font entries, and uses at least one of the double byte font entries to obtain a phonetic representation of the used at least one double-byte font.

According to another exemplary embodiment of the present invention, an article of manufacture is provided for use in programming a processor, the article of manufacture comprising at least one computer readable storage device including at least one computer program embedded therein that causes the processor to perform at least one exemplary embodiment of the present invention.

According to yet another exemplary embodiment of the present invention, a database structure is provides that includes at least two columns, one column including at least one section that includes double-byte number sets, and another column that includes at least one section that includes a phonetic representation of the double-byte number sets in the at least one section.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE EXEMPLARY EMBODIMENTS

Figure 1:
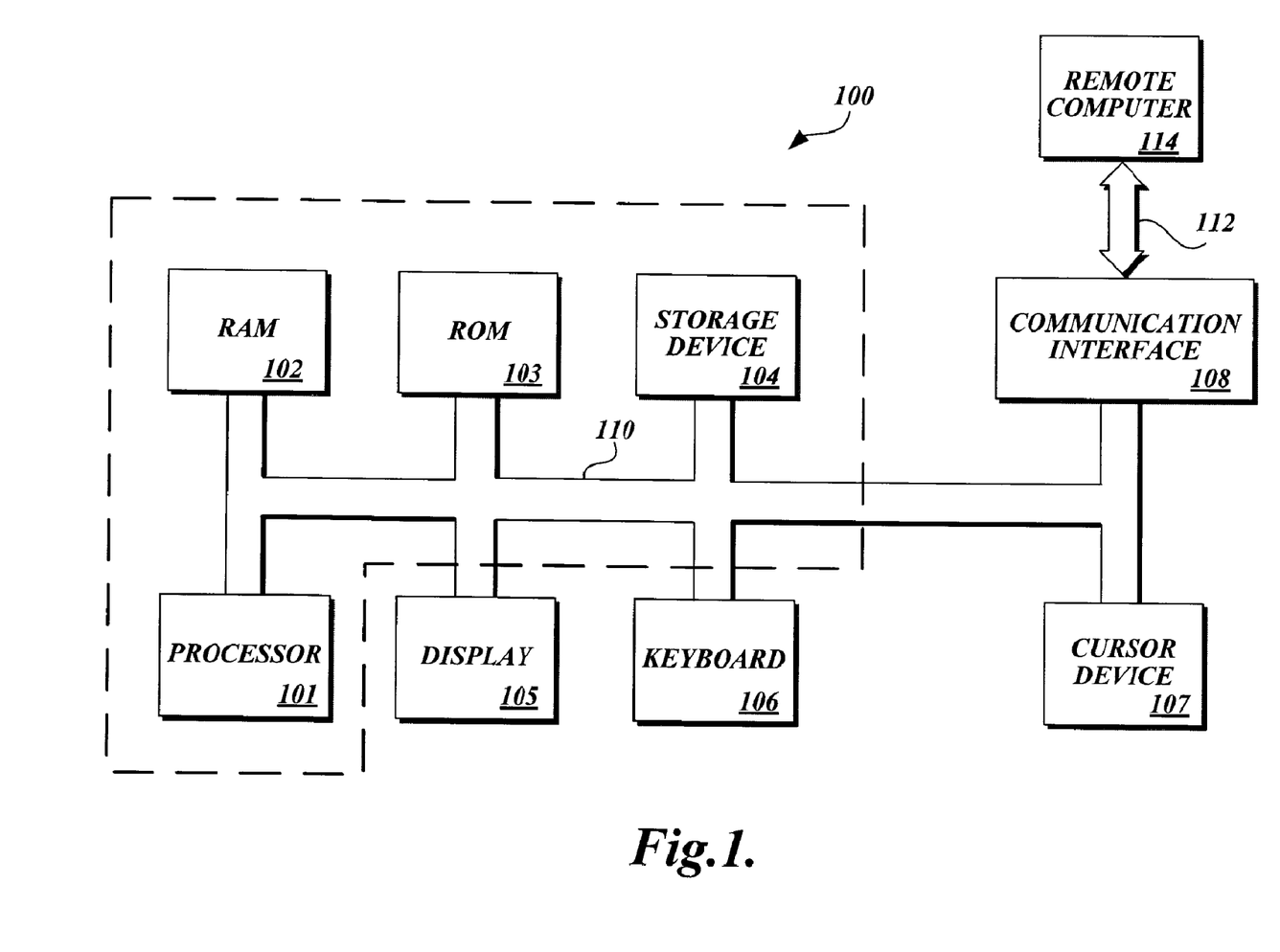
FIG. 1 is a logical block diagram of a general purpose computer system suitable for executing an exemplary embodiment of the present invention.

FIG. 1 illustrates a general computer system 100 within which the exemplary embodiments of the present invention can operate. The computer system 100 is capable of executing an application program, such as a word-processing program and/or email application, that potentially display a communication that includes double-byte fonts. Furthermore, the general purpose computer system 100 is capable of operating other application programs that may display communications that include double-byte fonts.

In general, computer systems, such as the general purpose computer system 100 that may be used by the exemplary embodiments of the present invention, include a bus 110 for communicating information to the various components of the computer system 100. A central processor (CPU) 101 is coupled to the bus 110 for processing information and instructions necessary to provide functionality for the computer system 100. The computer system 100 further includes a random access memory (RAM) 102 coupled with the bus 110 for storing information and instructions for the CPU 101, and a read only memory (ROM) 103 coupled with the bus 110 for storing static information and instructions for use by the CPU 101. Further included is a data storage device 104, such as a magnetic disk drive, an optical disk drive, or the like, that is coupled with the bus 110 for storing information and instructions that may be used by the CPU 101.

The system 100 may include a display device 105 coupled to the bus 110 for displaying information to a user of the system 100. An alphanumeric input device 106, such as a keyboard, may be coupled to the bus 110 to provide for inputting information that may be used by the CPU 101 to perform a function with the computer system 100. The computer system 100 may also include a cursor device, such as a mouse, for allowing additional input and control of the computer system 100. Similar to the other elements of the computer system 100, the keyboard 106 and the cursor device 107 are coupled to the bus 110.

The computer system 100 may include a communication interface 108 that is used to provide for linking of the computer system 100 to a network such as the Internet. As is illustrated in FIG. 1, the computer system 100 is linked to a remote computer 114 via a communications medium 112. The communications medium 112 facilitates bidirectional communication between the computer system 100 and the remote computer 114. The communications medium 112 may be a direct connection between the two computers 100 and 114, a connection established by one or more routers connected to server computers, a wireless connection, etc. As is generally understood by those skilled in the art, the communications medium 112 provides technology that allows the computer system 100 to receive and transmit digital communications (e.g., email communications, word-processing documents, etc.).

The CPU 101, RAM 102 and/or ROM 103 may be enabled with code for performing the exemplary embodiments of the present invention. Additional elements of the computer system 100 may also be enabled with code for performing the exemplary embodiments of the present invention. Those having skill in the art will readily appreciate that other similar devices used with computer systems may also be enabled to perform the exemplary embodiments of the present invention.

The computer system 100 is exemplary of may current and future computing platforms. In particular, the computer system 100, including all or some of the components illustrated in FIG. 1, may be a personal computer, laptop computer, tablet computer, handheld device, wireless phone, etc. In general, the exemplary embodiments of the present invention are operative with devices that have processing, storage and display facilities. These facilities may be provided internally and/or externally.

Figure 2:
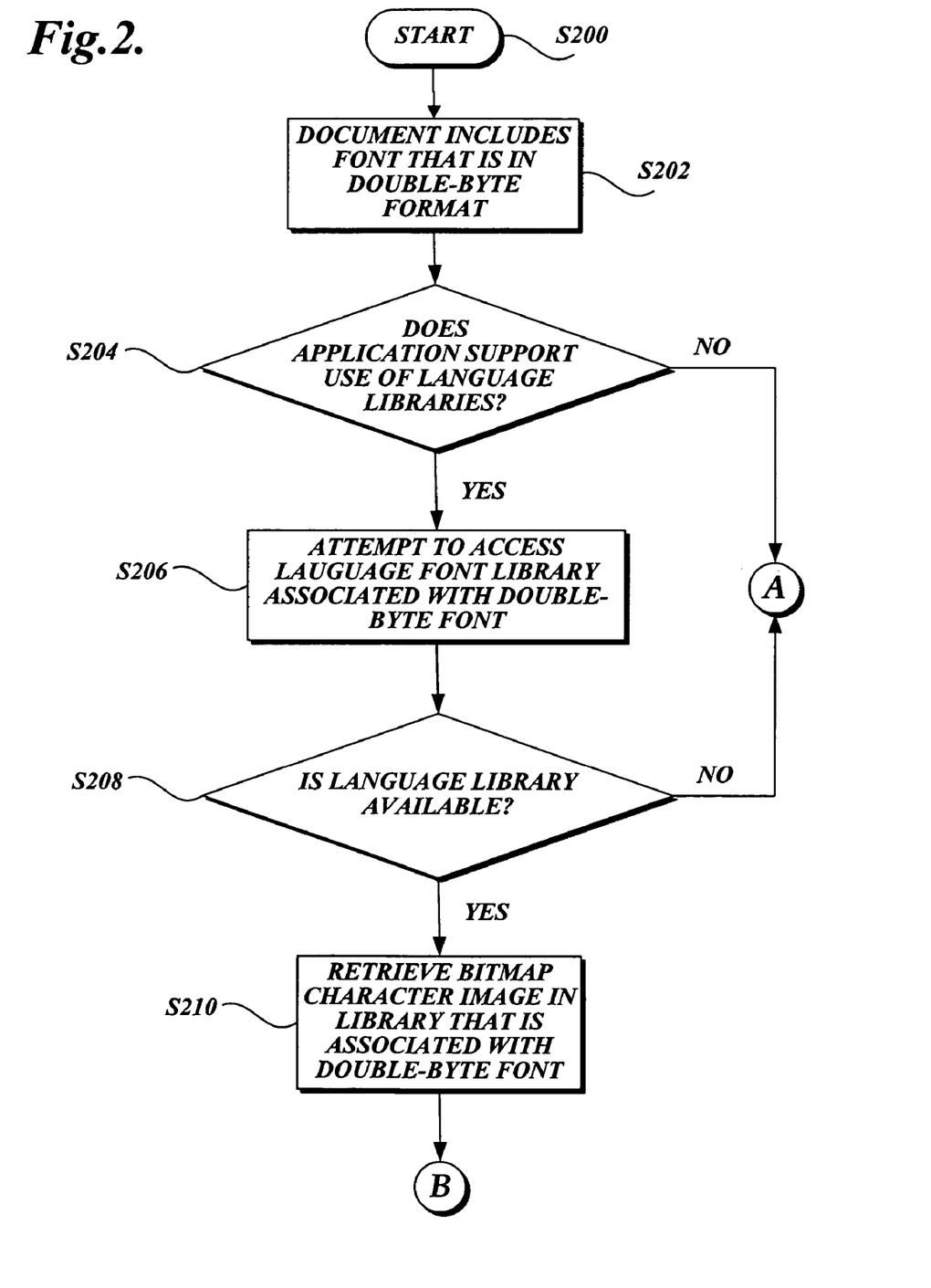
FIG. 2 illustrates a flowchart of a method that provides the capability for accessing a phonetic language database according to an exemplary embodiment of the present invention.
Figure 3:
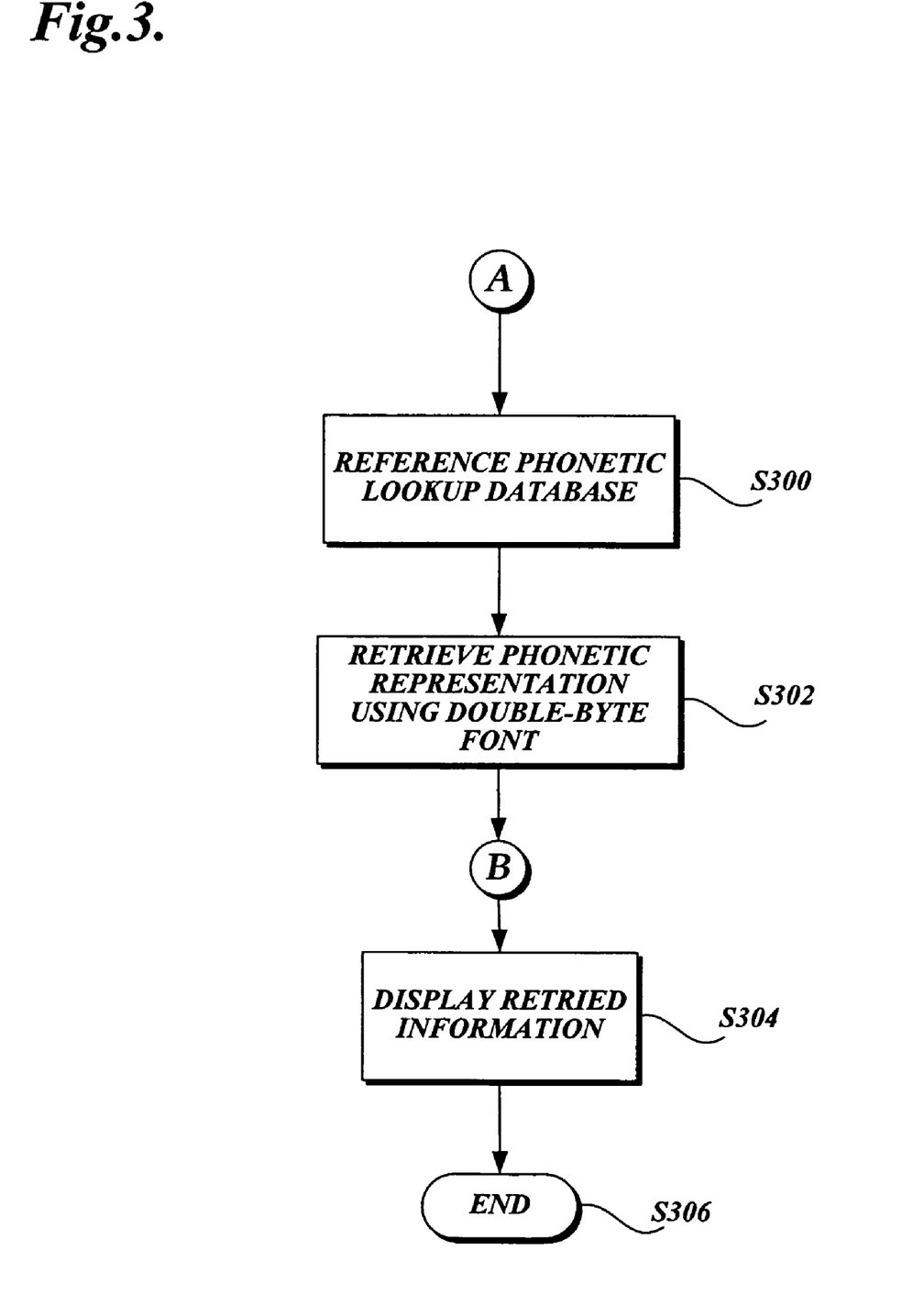
FIG. 3 illustrates a continuation of the flowchart illustrated in FIG. 2.

FIGS. 2 and 3 illustrate a flowchart of a method that provides capability for accessing a phonetic language database according to an exemplary embodiment of the present invention. The exemplary method illustrated in FIGS. 2 and 3 may be implemented using the computer system 100 illustrated in FIG. 1.

Those having ordinary skill in the art readily understand that the computer system 100 is merely exemplary of the type of computer system that may be used in conjunction with the exemplary embodiments of the present invention. In particular, the exemplary method illustrated in FIGS. 2 and 3 may be utilized using a personal computer, a laptop computer, a tablet computer, a handheld computer, a wireless telephone, or the like. Generally, any device capable of storing, processing, and displaying information may implement the exemplary method illustrated in FIGS. 2 and 3.

Block S200 generally illustrates the start of an exemplary method according to an embodiment of the present invention. At any given time, in a computer system such as the computer system 100 illustrated in FIG. 1, a document may include a font that is in double-byte format. For example, the computer system may receive an email communication from a remote computer, such as the remote computer 110, that includes language characters that are formatted using the double-byte font format. For example, to name just a few, Chinese, Japanese, and Korean languages all use characters that are represented in the double-byte font format.

When a document is received that includes a font that is in the double-byte format (S202), a software application is generally used to view the content of the document. When the application for viewing the document that includes the double-byte fonts is initialized in preparation for displaying the contents of the document on a display device, such as the display device 105, the application may attempt to access a language font library associated with the double-byte font if the application supports the use of such libraries (S204 and S206). If a language library is available to the computer system (S208), for example stored in a storage device such as the storage device 104, bitmap character images associated with the double-byte fonts in the document will be retrieved from the language library (S210). The retrieved bitmap character images will be displayed on the display device associated with the computer system (FIG. 3; S304).

In conventional computer systems, if the application for displaying the document that includes the fonts and double-byte format does not support the use of language libraries (S204), the information in the document is generally displayed on the display device of the computer system in an unpredictable manner. Certainly, the information conveyed on the display would not be that which is contained in the document that includes the double-byte fonts. Generally, the information displayed would be arbitrary ASCII characters or simply blank blocks in each position where a bitmap character image of the double-byte font would normally reside if a language library was used to display the contents of the document.

In accordance with an exemplary embodiment of the present invention, as is illustrated in FIG. 2, if the application that is used to display a document including fonts that are in double-byte format does not support the use of language libraries that include bitmap character images that are associated with double-byte fonts, or a language library is unavailable for the type of double-byte fonts that are contained in the document (S204 and S208), a phonetic lookup database is referenced in order to convey the information of the document that contains the fonts in double-byte format (S300). In particular, the fonts in double-byte format are used to retrieve the phonetic representations thereof that are stored in the phonetic lookup database (S302). Once the phonetic representations are found, the information retrieved is displayed on a display device of the computer system (S304).

Block S306 generally represents the termination of the exemplary method illustrated in FIGS. 2 and 3. As those of ordinary skill in the art readily understand, the exemplary method illustrated in FIGS. 2 and 3 may be repeated as required until all of the double-byte fonts included in a given document are referenced in an available language library and/or the phonetic lookup database in accordance with an exemplary embodiment of the present invention.

Figure 4:
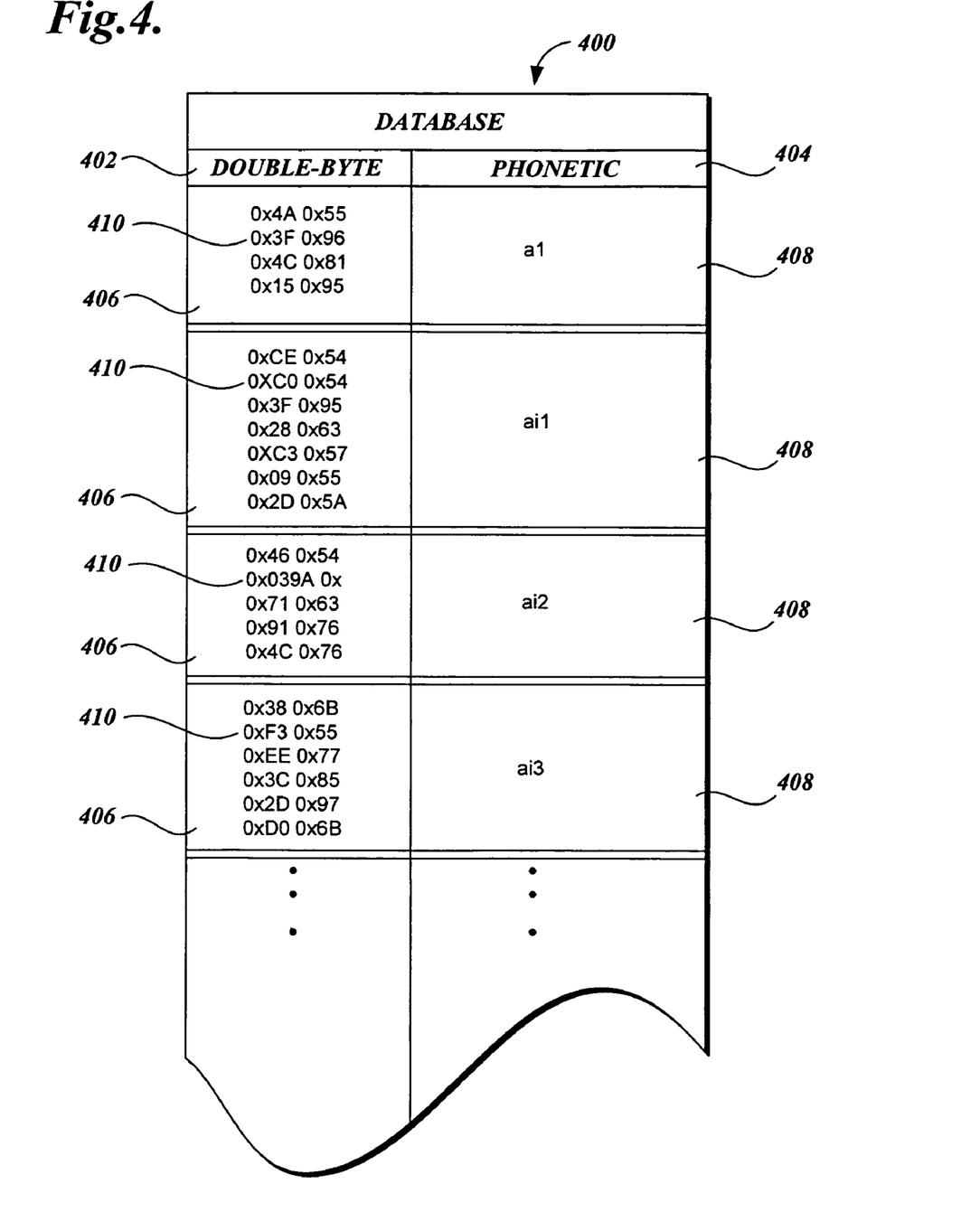
FIG. 4 is a conceptual diagram of an exemplary database and its contents that is representative of a phonetic language database in accordance with an exemplary embodiment of the present invention.

FIG. 4 is a conceptual diagram of an exemplary database and its contents that is representative of a phonetic language database 400 in accordance with an exemplary embodiment of the present invention. The database 400 includes a double-byte column 402 and a phonetic representation column 404. The double-byte font column 402 is broken into a plurality of sections 406. Similarly, there are corresponding sections 408 associated with the phonetic representation column 404.

Each section 406 in the double-byte column 402 includes ASCII numbers 410 that are representative of double-byte fonts that may be contained in a document that is desired to be viewed using a computer system, such as the computer system 100. If a document includes fonts that are in the double-byte format, and the database 400 is used as a method for displaying the fonts that are in the double-byte format, if one of the fonts is represented by the ASCII number set "0×4A 0×55", then the phonetic representation of "a1" will be displayed on the display device (such as the display 105) of the computer system. Similarly, if another font in the double-byte format is included and has the ASCII number set "0×CE 0×54", then the phonetic representation "ai1" will be displayed on the display device. For each font in the double-byte format, the database 400 may be accessed to determine the proper phonetic representation that should be displayed on the display device. Using the displayed phonetic representations of the fonts in the double-byte format, a user can easily understand information contained in the document that is desired to be conveyed.

Although other languages may be incorporated into a phonetic language database according to the exemplary embodiments of the present invention, the database 400 is intended to be used with communications that include Chinese script characters. As was discussed earlier in this document, the Chinese language has a constrained phonetic structure. In spoken Chinese, there are 412 basic phonetic units, each unit having a mono-syllabic sound. Four sound patterns can potentially be applied to each phonetic unit, resulting in slightly more than 1,000 distinct sounds.

The database 400 advantageously uses the 412 basic phonetic units to make a very efficient database structure that does not require the use of significant system resources. In the database 400 illustrated in FIG. 4, four of the 412 basic phonetic units are shown (a1, ai1, ai2 and ai3). However, as those of ordinary skill in the art appreciate, the other 408 basic phonetic units are included in the implemented database 400. Simply referencing a Chinese dictionary having script characters therein will provide even a layperson the necessary information to complete the illustrated database 400.

There are many Chinese character symbols that have the same sound. The database 400 takes this into consideration. For example, as is seen in FIG. 4, each of the sections 406 include a plurality of double-byte ASCII number sets. However, only one phonetic representation, in a respective section 408, is associated with a plurality of double-byte ASCII number sets.

The phonetic representations in phonetic representation column 404 of the database 400 have a "XXXn" format. The "XXX" portion is the one of the 412 basic phonetic units and is expressed as a series of Roman letters. There may be greater than or less than two letters in a given phonetic unit. The "n" portion is a number that represents one of the four sound patterns that can be applied to the each phonetic unit. So, a "1" in the "n" position relates to the first sound pattern, a "2" in the "n" position relates to the second sound pattern. This referencing technique also applies to the other two mono-syllabic sounds. Therefore, when the database 400 is used to convert fonts in double-bye format to an associated phonetic representation, a reader will understand the mono-syllabic sound that is associated with the phonetic unit by way of the "n" position associated with each phonetic unit.

Design and implementation of a database that uses phonetic representations for languages that use fonts in the double-byte format are fully embraced by the present invention. Although the database 400 is used with double-byte fonts associated with Chinese script characters, the use of the phonetic language database concept of the present invention may be applied to other languages that use the double-byte font format. Similar examples of such languages include Japanese and Korean.

Figure 5:
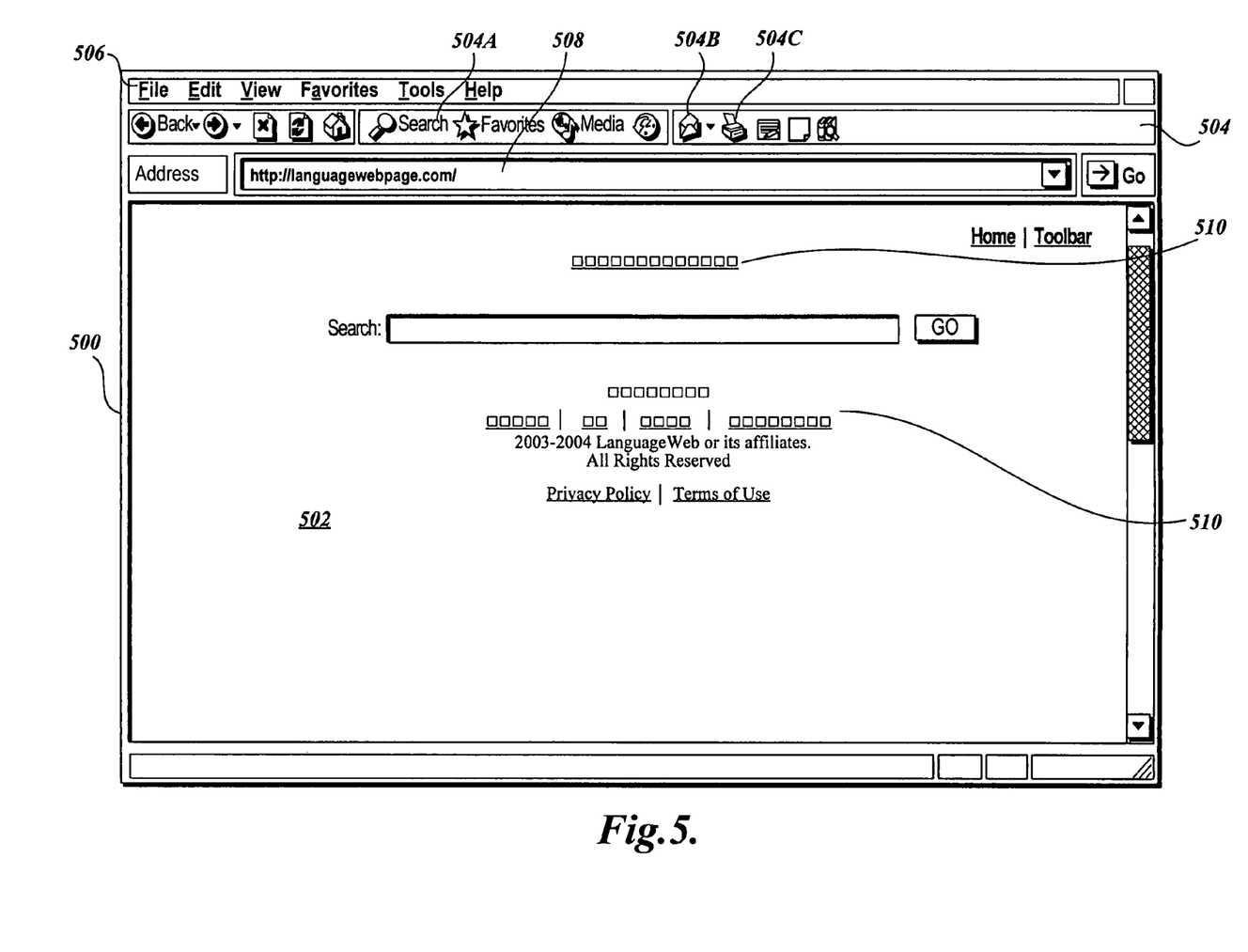
FIG. 5 illustrates a Web browser including a Web page that has not used a language library or a phonetic compatibility database according to an exemplary embodiment of the present invention.

FIG. 5 illustrates a Web browser 500 including a Web page 502 that has not used a language library or a phonetic compatibility database according to an exemplary embodiment of the present invention. The Web browser 500 is a GUI that is displayable on a computer system display device, such as the display device 105 of the computer system 100. The Web browser 500 is shown including a number of selection buttons 504, such as a search button 504A, a mail button 504B, a print button 504C, etc. The operation of the buttons 504A, 504B, and 504C, and other buttons and controls shown in FIG. 5, is understood by those having ordinary skill in the art and need not be described in detail herein.

FIG. 5 further includes various white boxes "□" 510 displayed on the Web page 502. Often, these white boxes 510 indicate there are double-byte fonts that could not be properly displayed by a computer system. This problem generally occurs when an operating system and/or application does not include and/or support the use of language libraries.

Figure 6:
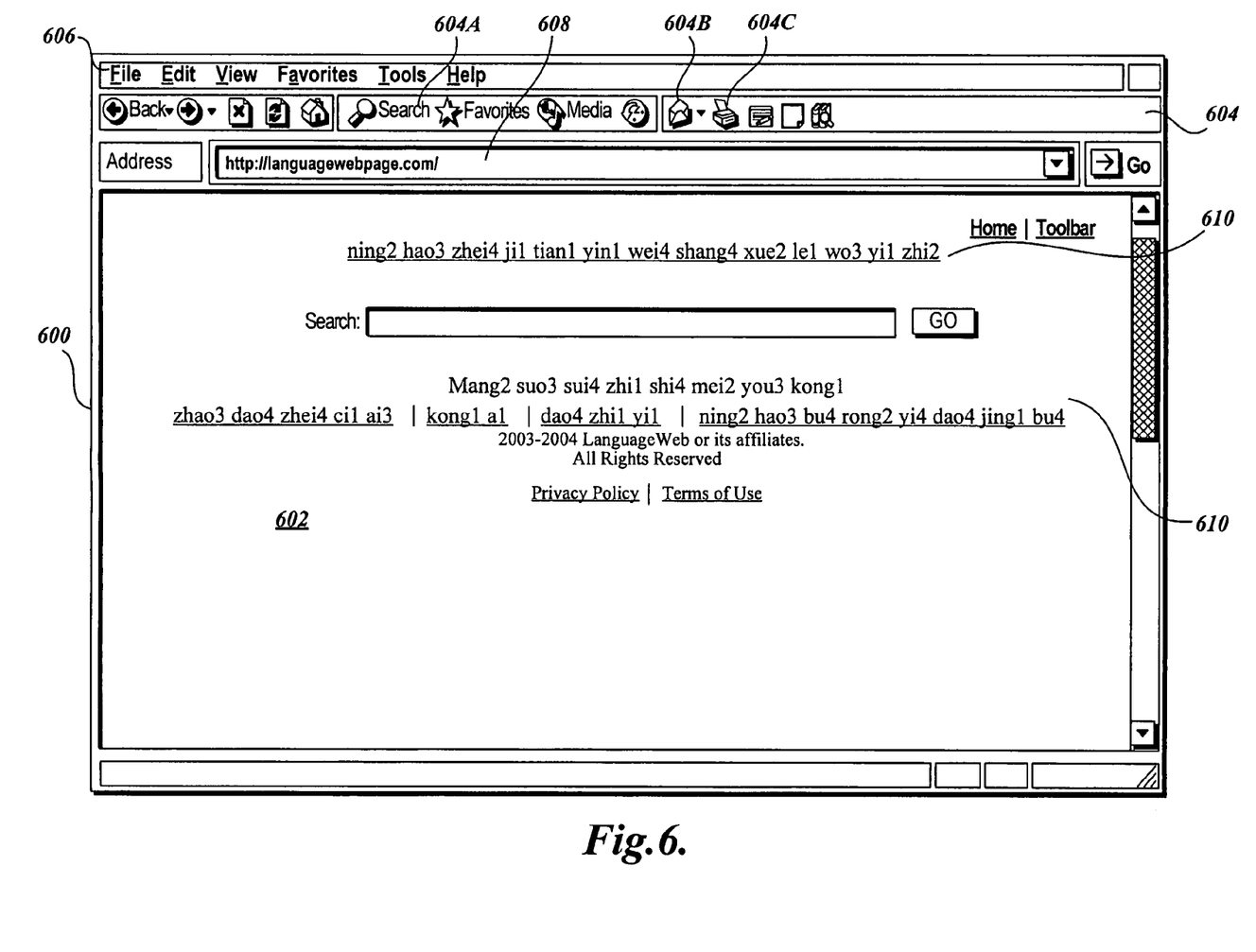
FIG. 6 illustrates a Web browser including a Web page that has used a phonetic compatibility database according to an exemplary embodiment of the present invention.

FIG. 6 illustrates a Web browser 600 including a Web page 602 that has used a phonetic compatibility database according to an exemplary embodiment of the present invention. The Web browser 600 is a GUI that is displayable on a computer system display device, such as the display device 105 of the computer system 100. The Web browser 600 is shown including a number of selection buttons 604, such as a search button 604A, a mail button 604B, a print button 604C, etc. The operation of the buttons 604A, 604B, and 604C, and other buttons and controls shown in FIG. 6, is understood by those having ordinary skill in the art and need not be described in detail herein.

FIG. 6 further includes various phonetic representations 610 that are in the "XXXn" format. The phonetic representations 610 were obtained from a phonetic language database according to an exemplary embodiment of the present invention. The use of a phonetic language database according to an exemplary embodiment of the present invention removes the need to include memory greedy language libraries. This is especially useful for computer systems that have limited memory due to design restraints and/or design considerations. Computer systems that do use language libraries may also include a phonetic language database for use with application software, etc.

Although specific exemplary embodiments have been illustrated and described herein, it will be appreciated by those of ordinary skill in the art that any arrangement which is calculated to achieve the same purpose may be substituted for the specific exemplary embodiments shown and discussed. These applications are intended to cover any and all adaptations or variations of the present invention. It is also to be understood that the above description has been made in an illustrated fashion, and not in a restrictive one. Combinations of the above exemplary embodiments, and other exemplary embodiments not specifically described herein, will be apparent to those of skill in the art upon reviewing the above description. The scope of the present invention includes any other applications in which the above methods and structures are used. Therefore, the scope of the present invention should be determined with reference to the appended claims, along with the full range of equivalents to which such claims are entitled.

The embodiments of the invention in which an exclusive property or privilege is claimed are defined as follows:

1. A method for displaying a phonetic of a character in double-byte font on a display of a computing device that cannot display the character in double-byte font, comprising:
 referencing the character in double-byte font to a database containing a table comprising ASCII entries that identify a plurality of characters in double-byte font and an associated phonetic of each ASCII entry;
 using an ASCII entry of the character in double-byte font to obtain the associated phonetic of the ASCII entry; and
 displaying the phonetic in place of the character in double-byte font on the display of the computing device that cannot display the character in double-byte font.

2. The method of claim 1 further comprising:
 (a) examining a communication to identify characters in double-byte font; and
 (b) for each identified character in double-byte font:
  (i) using the character in double-byte font in the communication to reference the database containing the table comprising ASCII entries that identify a plurality of characters in double-byte font;
  (ii) obtaining an associated phonetic of the ASCII entry of the character in double-byte font; and
  (iii) displaying the phonetic in place of the character in double-byte font on the display of the computing device that cannot display the character in double-byte font.

3. The method of claim 2 further comprising displaying on the display of the computing device that cannot display the character in double-byte font the phonetic of all characters in double-byte font in the communication in a single operation.

4. The method of claim 1, wherein the table comprising two columns, wherein a first column includes a plurality of sections, wherein each section comprising a plurality of ASCII entries identifying a plurality of characters in double-byte font and a second column includes a plurality of sections, wherein each section comprising an associated phonetic entry of the plurality of ASCII entries in the corresponding section of the first column.

5. The method of claim 4, wherein the ASCII entries in each section of the first column are for Chinese language characters and the associated phonetic entry of the plurality of ASCII entries in the corresponding section of the first column includes a Chinese language phonetic unit.

6. The method of claim 5, wherein the Chinese language phonetic unit includes a numeric indicator for one of four mono-syllabic sounds.

7. The method of claim 1, wherein the table is contained in a phonetic language database.

8. An article of manufacture for use in programming a processor, the article of manufacture comprising a computer readable storage device including a computer program embedded therein for displaying a phonetic of a character in double-byte font on a display by:
 referencing the character in double-byte font to a database containing a table comprising ASCII entries that identify a plurality of characters in double-byte font and an associated phonetic of each ASCII entry;
 choosing an ASCII entry of the character in double-byte font to obtain the associated phonetic of the ASCII entry; and
 displaying the phonetic in place of the character in double-byte font on the display by the computer program that is not operable for displaying the character in double-byte font.

9. The article of manufacture of claim 8, wherein the table comprising two columns, wherein a first column includes a plurality of sections, wherein each section comprising a plurality of ASCII entries identifying a plurality of characters in double-byte font and a second column includes a plurality of sections, wherein each section comprising an associated phonetic entry of the plurality of ASCII entries in the corresponding section of the first column.

10. The article of manufacture of claim 9, wherein the ASCII entries in each section of the first column are for Chinese language characters and the associated phonetic entry of plurality of ASCII entries in the corresponding section of the first column includes a Chinese language phonetic unit.

11. The article of manufacture of claim 10, wherein the Chinese language phonetic unit includes a numeric indicator for one of four mono-syllabic sounds.

12. A computing device that cannot display a character in double-byte font for displaying a phonetic of the character in double-byte font on a display of the computing device, the computing device comprising:
- a memory storing a database structure comprising a table containing two columns, wherein a first column includes a section containing a plurality of ASCII representations identifying a plurality of characters in double-byte font, and a second column includes a corresponding section containing a phonetic representation of the plurality of ASCII representations in the corresponding section of the first column;
- a reference component operable to reference the character in double-byte font to one of the plurality of ASCII representations and the corresponding phonetic representation;
- a retrieve component operable to retrieve the phonetic representation of the ASCII representation identifying the character in double-byte font; and
- a display component operable to display the phonetic representation in place of the character in double-byte font on the display of the computing device that cannot display the character in double-byte font.

13. The computing device of claim 12, wherein the phonetic representation includes two distinct subparts, wherein one subpart is a phonetic unit comprising Roman characters and another subpart comprising a numerical value representing a mono-syllabic sound of the phonetic unit.

14. The computing device of claim 13, wherein the phonetic representation corresponds to a Chinese language character.

15. The computing device of claim 12, wherein the table contains a plurality of sections in the first column containing a plurality of ASCII representations identifying a plurality of characters in double-byte font, and a plurality of corresponding sections in the second column containing a phonetic representation of the plurality of ASCII representations in the corresponding section of the first column.

16. The computing device of claim 15, wherein the plurality of ASCII representations and the corresponding phonetic representation relate to Chinese language characters.

* * * * *